C. M. ERICKSON.
MEANS FOR ATTACHING DRAFT BARS TO SLEIGH RUNNERS.
APPLICATION FILED FEB. 24, 1912.
1,080,960.
Patented Dec. 9, 1913.
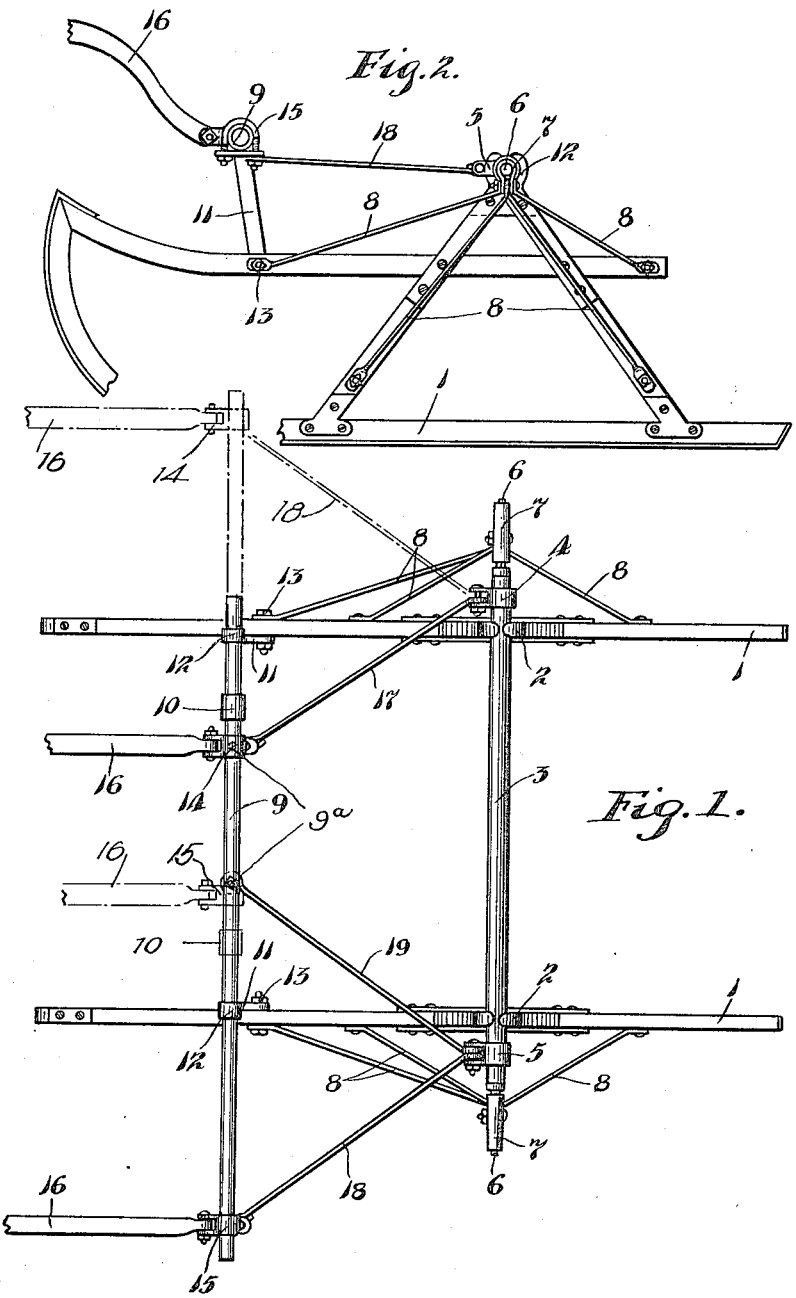
Witnesses.
H. L. Opsahl.
Geo. Knutson
Inventor:
Charles M. Erickson,
By his Attorneys,

UNITED STATES PATENT OFFICE.

CHARLES M. ERICKSON, OF CLARKFIELD, MINNESOTA.

MEANS FOR ATTACHING DRAFT-BARS TO SLEIGH-RUNNERS.

1,080,960.   Specification of Letters Patent.   Patented Dec. 9, 1913.

Application filed February 24, 1912. Serial No. 679,565.

*To all whom it may concern:*

Be it known that I, CHARLES M. ERICKSON, a citizen of the United States, residing at Clarkfield, in the county of Yellow Medicine and State of Minnesota, have invented certain new and useful Improvements in Means for Attaching Draft-Bars to Sleigh-Runners; and I do hereby declare the following to be a full, clear, and exact description of the invention, such as will enable others skilled in the art to which it appertains to make and use the same.

My invention has for its object to provide improved means for attaching draft bars to sleigh runners and is especially intended for use on sleigh runners which are adapted to be mounted on the journals of a vehicle in place of the wheels and which have independent oscillatory movements, with respect to each other, in vertical planes.

To this end, the invention consists of the novel devices and combinations of devices hereinafter described and defined in the claims.

The invention is illustrated in the accompanying drawings wherein like characters indicate like parts throughout the several views.

Referring to the drawings, Figure 1 is a plan view of a pair of sleigh runners mounted on the front axle of a vehicle and having attached thereto, by means of the improved draft bar, a pair of thills, some parts thereof being broken away; and Fig. 2 is a side elevation of the parts shown in Fig. 1.

The numeral 1 indicates a pair of independent front sleigh runners each having rigidly secured to its rave an upwardly extended bifurcated axle supporting bearing 2. The front axle 3 of a vehicle (not shown) is loosely mounted between the prongs of the bearings 2. The customary pair of thill couplings 4 and 5 are secured to the axle 3 between its wheel journals 6 and the bifurcated bearings 2. Bearing sleeves 7 are loosely mounted on the journals 6 of the axle 3 in place of the wheels. These bearing sleeves 7 are rigidly secured to the sleigh runners 1 outward thereof by means of a plurality of brace rods 8. As is evident, the bifurcated bearings 2 and the bearing sleeves 7 hold the sleigh runners 1 with freedom for independent oscillatory movements, with respect to each other, in vertical planes. The parts thus far described may be of the standard or of any desired construction.

Referring now in detail to my invention, the numeral 9 indicates a two part draft bar comprising a long and a short section detachably connected by means of a coupling sleeve 10 having screw threaded engagement therewith. The draft bar 9 is preferably made round in cross section and extends horizontally and transversely with respect to the sleigh runners 1. Vertically extended bars 11 support the draft bar 9 above the sleigh runners 1 and intermediately between the bifurcated bearings 2 and the front ends of the said runners. The upper ends of the bars 11 terminate in alined and horizontally extended bearing sleeves 12 through which the draft bar 9 is telescoped endwise. Bolts 13 pivotally connect the lower ends of the bars 11 to the raves of the front sleigh runners 1. Clips 14 and 15 are frictionally clamped onto the draft bar 9 with freedom for lateral adjustments thereon. A pair of thills 16 are pivotally attached to the clips 14 and 15 with freedom for vertical movements. In this position of the thills 16, a brace rod 17 is pivotally connected at its ends to the clip 4 and the clip 14. A second brace rod 18 is pivotally connected at its ends to the clip 5 and the clip 15, and a third brace rod 19 is pivotally connected at one of its ends to the clip 5 and its other end is pivotally secured to the intermediate portion of the draft bar 9 by a bolt 9ª. These brace rods 17, 18, and 19 hold the bars 11 in their vertical positions and also hold the draft bar 9 against endwise movement. At the same time, these brace rods, owing to their pivotal connections, permit the draft bar 9 to work in the bearing sleeves 12 thereby allowing the independent oscillatory movements of the sleigh runners 1. These independent oscillatory movements of the sleigh runners 1 are highly important, particularly on rough roads, in order to prevent undue strains thereon.

In the drawings, the thills 16 are so positioned, with respect to the vehicle, that a single horse can travel in the left hand track of the road. To shift the thills 16 into a position as shown by dotted lines in Fig. 1, to permit a single horse to travel in the right hand track of the road, it is necessary to remove from the draft bar 9 all of the parts connected thereto. Said draft bar 9 is then turned end for end in the sleeves 12. The clips 14 and 15 to which the thills 16 are secured are then again secured to the draft bar 9 in the positions indicated by dotted lines in Fig. 1. In this position of the draft bar 9, the braces 17 and 19 remain the same, as indicated by full lines in Fig. 1, with the exception that their forward ends are secured, respectively, to the bolt 9ª and the clip 15. But it is necessary to change the position of the brace 18 from its full line position to its dotted line position, as indicated in Fig. 1. In its dotted line position, the rear end of the brace 18 is secured to the clip 4, and its forward end is secured to the clip 14.

When it is desired to use a pole for two horses instead of the thills 16, the draft bar 9 is adjusted in the bearing sleeves 12 in a position to bring the pole in the center of the road. The short end of the draft bar 9 and coupling 10 are also removed to prevent the same from projecting beyond the side of the vehicle. It will also be necessary to substitute shorter braces for the braces 17, 18, and 19.

What I claim is—

1. The combination with a pair of sleigh runners mounted for independent oscillatory movements with respect to each other, of a draft bar, diagonal brace rods connecting said draft bar to said runners in a manner to permit said independent oscillatory movements thereof, and a pair of thills mounted for lateral adjustments on said draft bar, said brace rods being made in duplicates and interchangeable to permit said draft bar to be adjusted endwise to bring said thills in different lateral positions, substantially as described.

2. The combination with a pair of sleigh runners mounted for independent oscillatory movements with respect to each other, of eye-bolts attached to said runners, a draft bar loosely mounted for end-wise movement in the eyes of said eye-bolts, diagonal brace rods connecting said draft bar to said runners in a manner to permit said independent oscillatory movements thereof, and a pair of thills connected to said draft bar, said brace rods being made in duplicates and interchangeable to permit said draft bar to be adjusted endwise to bring said thills in different lateral positions, substantially as described.

3. The combination with a pair of sleigh runners mounted for independent oscillatory movements with respect to each other, of eye-bolts attached to said runners, a draft bar loosely mounted for endwise movement in the eyes of said eye-bolts, diagonal brace rods connecting said draft bar to said runners in a manner to permit said independent oscillatory movements thereof, and a pair of thills adjustably connected to said draft bar, said brace rods being made in duplicates and interchangeable to permit said draft bar to be adjusted endwise to bring said thills in different lateral positions, substantially as described.

4. The combination with a pair of sleigh runners mounted for independent oscillatory movements with respect to each other, of a pair of eye-bolts attached to said runners, a draft bar loosely mounted for endwise movement in the eyes of said eye-bolts, a pair of clips mounted on said draft bar for lateral adjustments, diagonal brace rods pivotally connecting said clips to said runners in a manner to permit said independent oscillatory movements thereof, and a pair of thills pivotally connected to said clips, said brace rods being made in duplicates and interchangeable to permit said draft bar to be adjusted endwise to bring said thills in different lateral positions, substantially as described.

In testimony whereof I affix my signature in presence of two witnesses.

CHARLES M. ERICKSON.

Witnesses:
   I. F. FAGERLIE,
   C. F. LIEBERG.

---

Copies of this patent may be obtained for five cents each, by addressing the "Commissioner of Patents, Washington, D. C."